United States Patent
Dhakshinamoorthy et al.

(10) Patent No.: US 10,432,647 B2
(45) Date of Patent: Oct. 1, 2019

(54) MALICIOUS INDUSTRIAL INTERNET OF THINGS NODE ACTIVITY DETECTION FOR CONNECTED PLANTS

(71) Applicant: Honeywell International Inc., Morris Plains, NJ (US)

(72) Inventors: Chandirasekaran Dhakshinamoorthy, Govindasalai (IN); Lekshmi Premkumar, Thiruvananthapuram (IN); Rod Stein, Edmonton (CA); Satheesh Kumar Bhuvaneswaran, Chennai (IN); Prosanta Mondal, Habra (IN)

(73) Assignee: Honeywell International Inc., Morris Plains, NJ (US)

( * ) Notice: Subject to any disclaimer, the term of this patent is extended or adjusted under 35 U.S.C. 154(b) by 206 days.

(21) Appl. No.: 15/634,820

(22) Filed: Jun. 27, 2017

(65) Prior Publication Data

US 2018/0375880 A1 Dec. 27, 2018

(51) Int. Cl.
*H04L 29/06* (2006.01)
*H04W 4/70* (2018.01)

(52) U.S. Cl.
CPC ...... *H04L 63/1416* (2013.01); *H04L 63/1425* (2013.01); *H04W 4/70* (2018.02)

(58) Field of Classification Search
CPC ... H04L 63/1425; H04L 63/1416; H04W 4/70
See application file for complete search history.

(56) References Cited

U.S. PATENT DOCUMENTS

| | | | |
|---|---|---|---|
| 7,603,711 B2 | 10/2009 | Scheidell | |
| 8,898,789 B2 | 11/2014 | Shanley | |
| 9,395,436 B2 | 7/2016 | Katuri et al. | |
| 9,558,352 B1 | 1/2017 | Dennison et al. | |
| 9,779,229 B2 | 10/2017 | Rooyakkers et al. | |
| 2004/0117624 A1* | 6/2004 | Brandt | H04L 63/1408 713/166 |
| 2004/0162995 A1 | 8/2004 | Muaddi et al. | |
| 2013/0031037 A1* | 1/2013 | Brandt | H04L 63/1408 706/12 |
| 2016/0234241 A1 | 8/2016 | Talamanchi et al. | |
| 2016/0261482 A1* | 9/2016 | Mixer | H04L 43/12 |
| 2017/0126704 A1 | 5/2017 | Nandha Premnath et al. | |
| 2017/0310694 A1* | 10/2017 | Kamiya | G06F 21/56 |

* cited by examiner

*Primary Examiner* — Baotran N To

(57) ABSTRACT

A method and apparatus for identifying malicious activity. At least one memory is configured to store historical communication data. At least one processor is configured to retrieve the historical communication data related to communications between a server and a plurality of clients in a system. The processor is further configured to cluster the historical communication data to group communications of the historical communication data. The processor is further configured to identify a plurality of patterns that indicate malicious activity based on the grouped communications. The processor is further configured to receive current communication data. The processor is further configured to determine whether the current communication data matches the one of the plurality of patterns. The processor is further configured to, responsive to a grouped element of the grouped communications matching the pattern, identifying a group of communications between the server and the plurality of clients as the malicious activity.

20 Claims, 6 Drawing Sheets

MALICIOUS INDUSTRIAL INTERNET OF THINGS NODE ACTIVITY DETECTION FOR CONNECTED PLANTS

TECHNICAL FIELD

This disclosure relates generally to the Industrial Internet of Things (IIoT). More specifically, this disclosure relates to an apparatus and method for malicious IIoT node activity detection for connected plants.

BACKGROUND

Process plants are often managed using industrial process control and automation systems. Conventional control and automation systems routinely include a variety of networked devices, such as servers, workstations, switches, routers, firewalls, safety systems, proprietary real-time controllers, and industrial field devices. The challenges of the IIoT escalate the threat of damage from cyber-attacks that can cause disruptions or longer outages, at significant cost for the IIoT ecosystem. IIoT plant network administrators face challenges looking or analyzing for malicious activity among the thousands of connected IIoT nodes (powered by Object Linking and Embedding for Process Control (OPC) Unified Architecture (UA) transport protocols. Currently any existing third party security vendor intrusion detection system (IDS) or application firewall does not have the ability to analyze the malicious packets with UA transport protocols, which is the standard communication protocol used in machine-to-machine (M2M) communications in IIoT ecosystems.

SUMMARY

This disclosure provides an apparatus and method for malicious IIoT node activity detection for connected plants.

An embodiment of this disclosure provides a method for identifying malicious activity. The method includes retrieving historical communication data related to communications between a server and a plurality of clients in a system. The method also includes clustering the historical communication data to group communications of the historical communication data. The method also includes identifying a plurality of patterns for indicating the malicious activity based on the grouped communications. The method also includes receiving current communication data. The method also includes determining whether the current communication data matches the one of the plurality of patterns. The method also includes, responsive to a grouped element of the plurality of grouped communications matching the pattern, identifying a group of communications between the server and the plurality of clients as the malicious activity.

Another embodiment of this disclosure provides a system that includes a memory and at least one processor. The memory is configured to store historical communication data. The at least one processor is configured to retrieve the historical communication data related to communications between a server and a plurality of clients in a system. The at least one processor is further configured to cluster the historical communication data to group communications of the historical communication data. The at least one processor is further configured to identify a plurality of patterns for indicating the malicious activity based on the grouped communications. The at least one processor is further configured to receive current communication data. The at least one processor is further configured to determine whether the current communication data matches the one of the plurality of patterns. The at least one processor is further configured to, responsive to a grouped element of the grouped communications matching the pattern, identifying a group of communications between the server and the plurality of clients as the malicious activity.

Yet another embodiment provides a non-transitory computer readable medium containing instructions that, when executed by at least one processing device, cause the at least one processing device to retrieve historical communication data related to communications between a server and a plurality of clients in a system. The instructions further cause the at least one processing device to cluster the historical communication data to group communications of the historical communication data. The instructions further cause the at least one processing device to identify a plurality of patterns for indicating the malicious activity based on the grouped communications. The instructions further cause the at least one processing device to receive current communication data. The instructions further cause the at least one processing device to determine whether the current communication data matches the one of the plurality of patterns. The instructions further cause the at least one processing device to, responsive to a grouped element of the grouped communications matching the pattern, identifying a group of communications between the server and the plurality of clients as the malicious activity.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
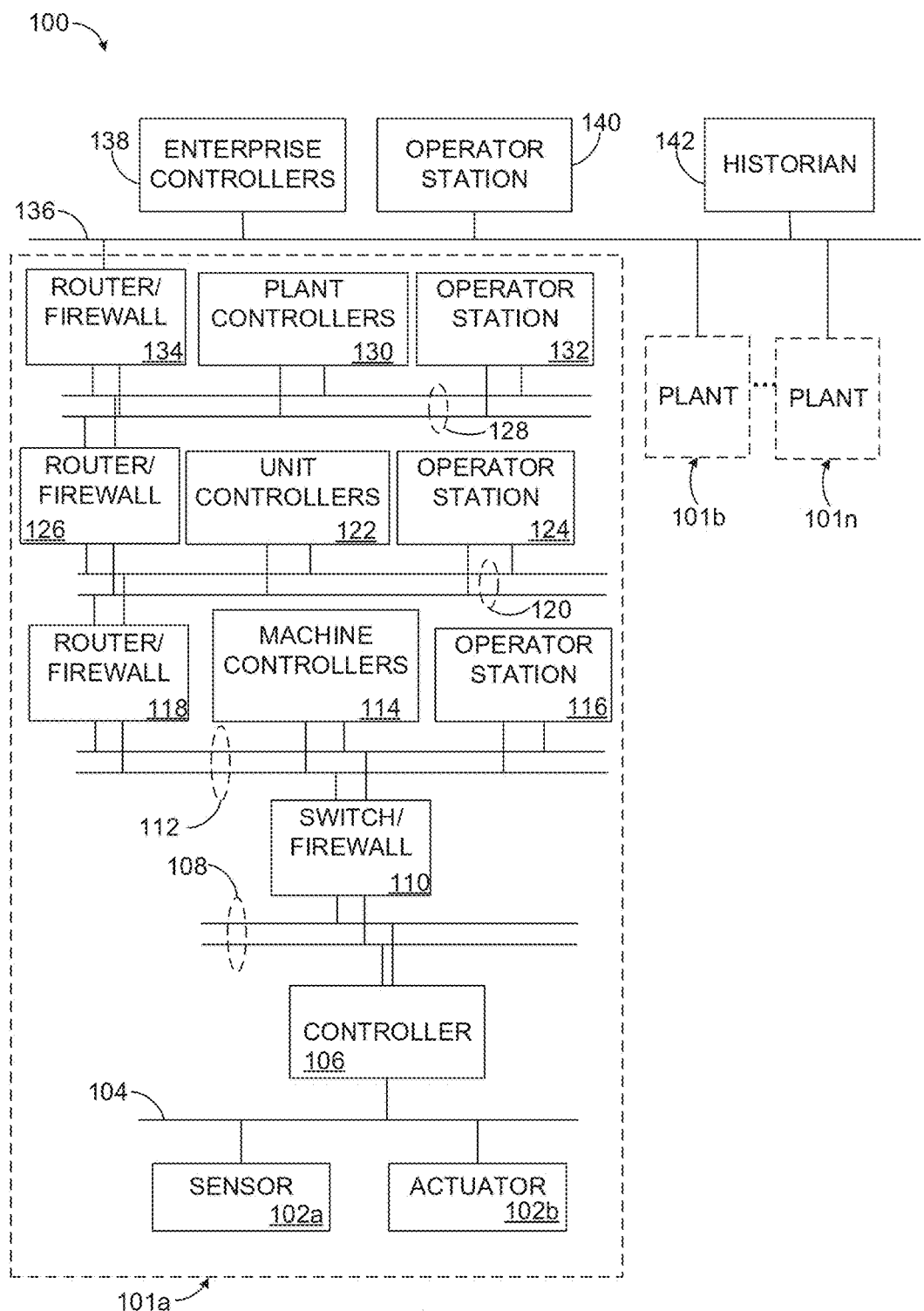
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

One or more networks 104 are coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" includes one or more controllers 106, which are coupled to the network 104. Among other things, each controller 106 may use the measurements from one or more sensors 102a to control the operation of one or more actuators 102b. Each controller 106 includes any suitable structure for controlling one or more aspects of a process system. As a particular example, each controller 106 could represent a computing device running a real-time operating system.

Redundant networks 108 are coupled to the controllers 106. The networks 108 facilitate interaction with the controllers 106, such as by transporting data to and from the controllers 106. The networks 108 could represent any suitable redundant networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS, LINUX, or other operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS, LINUX, or other operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS, LINUX, or other operating system. Although not shown, different unit-level controllers 122 could be used to control different units in a process system (where each unit is associated with one or more machine-level controllers 114, controllers 106, sensors 102*a*, and actuators 102*b*).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS, LINUX, or other operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101*a*-101*n*, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS, LINUX, or other operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS, LINUX, or other operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101*a*-101*n* and to control various aspects of the plants 101*a*-101*n*. The enterprise-level controllers 138 can also perform various functions to support the operation and control of components in the plants 101*a*-101*n*. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS, LINUX, or other operating system. In this document, the term "enterprise" refers to an organization having one or more plants or other processing facilities to be managed. Note that if a single plant 101*a* is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS, LINUX, or other operating system.

A historian 142 is also coupled to the network 136 in this example. The historian 142 could represent a component that stores various information about the system 100. The historian 142 could, for example, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100. The historian 142 can be, for example, a database or set of databases that includes a security events archiver and/or UA log files.

One or more of the devices shown in FIG. 1 could support an IIoT ecosystem, OPC UA, and the techniques described herein for intelligent security agents. For example, any of the controllers, operator stations, or other computing devices shown in FIG. 1 (or added to FIG. 1 according to particular needs) could support the techniques described in this patent document.

As described in more detail below, one or more embodiments of this disclosure provide an intelligent security agent in the IIoT ecosystem. This security agent acts as a unified architecture (UA) client to subscribe to a UA server to retrieve UA security audit events on the UA server, or the UA server can gather the required security parameters from the events archiver data and UA log data. Malicious activity can include, for example, an open platform communications (OPC) UA node sending a flood of "Hello" UA TCP messages or sending a flood of unauthorized UA requests with a malicious intent. Using a combination of an unsupervised clustering algorithm and a supervised classifier algorithm (i.e., a hybrid machine-learning process), the security agent can detect the malicious activity and report to plant administrator. The security agent can detect a malicious intent as well as a credible, and malfunctioning, component that is acting in a way that may be considered malicious. The security agent could be a standalone application or work in conjunction with other intrusion detection systems (IDS), or be a part of another IDS as a component or directly as part of its functionality.

Although FIG. 1 illustrates one example of an industrial process control and automation system 100, various changes may be made to FIG. 1. For example, industrial control and automation systems come in a wide variety of configurations. The system 100 shown in FIG. 1 is meant to illustrate one example operational environment in which the use of intelligent security agents in an IIoT ecosystem is desired. However, FIG. 1 does not limit this disclosure to any particular configuration or operational environment. In general, the techniques described in this patent document can be used in any suitable system, and that system need not relate to industrial process control or automation.

Figure 2:
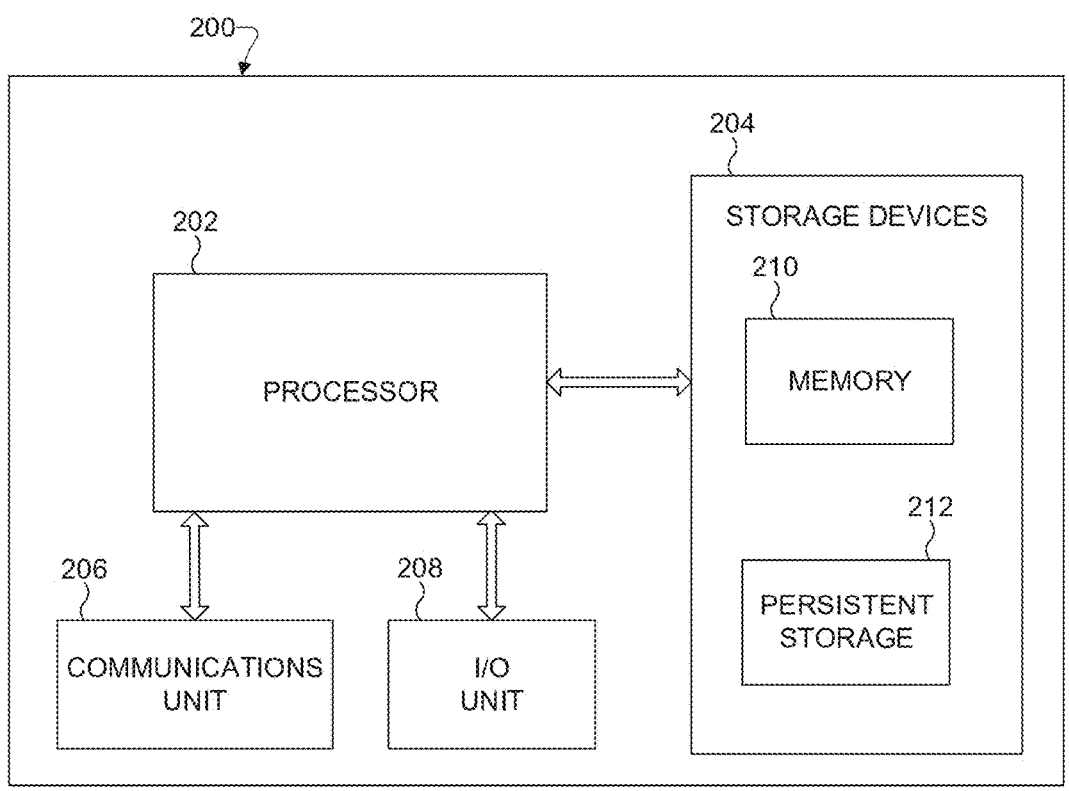
FIG. 2 illustrates an example computing device supporting an intelligent security agent in the IIoT ecosystem according to this disclosure.

FIG. 2 illustrates an example computing device 200 supporting an intelligent security agent in the IIoT ecosystem according to this disclosure. The device 200 could, for example, represent any of the computing devices shown in FIG. 1 and described above. However, the device 200 could represent any other suitable computing system where an intelligent security agent in the IIoT ecosystem may be needed or desired.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include at least one network interface card or wireless transceiver facilitating communications over at least one wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates one example of a device 200 supporting an intelligent security agent in the IIoT ecosystem, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of computing device.

The disclosed embodiments provide a dynamic security solution for malicious activity detection in connected plants or IIoT ecosystems. The embodiments also provide a dynamic machine-learning model, where the malicious detection patterns are frequently updated to cover new attack patterns. The embodiments further provide a proposed security agent that can be a standalone application or work in conjunction with another IDS, or could be a part of another IDS as a component or directly as part of its functionality.

The proposed IIoT security agent can enable a continuous monitoring and analyzing of UA node activities for malicious activities, ensuring security compliance. The agent ensures maximum plant uptime by detecting IIoT cyber threats that could impact operational performance of connected devices. Detection of cyber threats ensures the efficient usage of network bandwidth for processing time sensitive IIoT events. The agent provides a detection mechanism for wide variety of cyber-attacks.

The intelligent IIoT security agent, on a periodic basis, monitors the following sources for collecting security audit events. A UA events archiver is a collection of UA security audit events and UA log files. Additionally, in some embodiments, the security agent can subscribe to the UA server and monitor the UA security related events on a periodic basis for collection of parameters.

A hybrid machine-learning process can be used by combining an unsupervised clustering algorithm with a supervised classifier algorithm. The IIoT security system could be standalone system working alone or in conjunction with another IDS, or can be a part of another IDS as a component or directly as part of its functionality.

Figure 3:
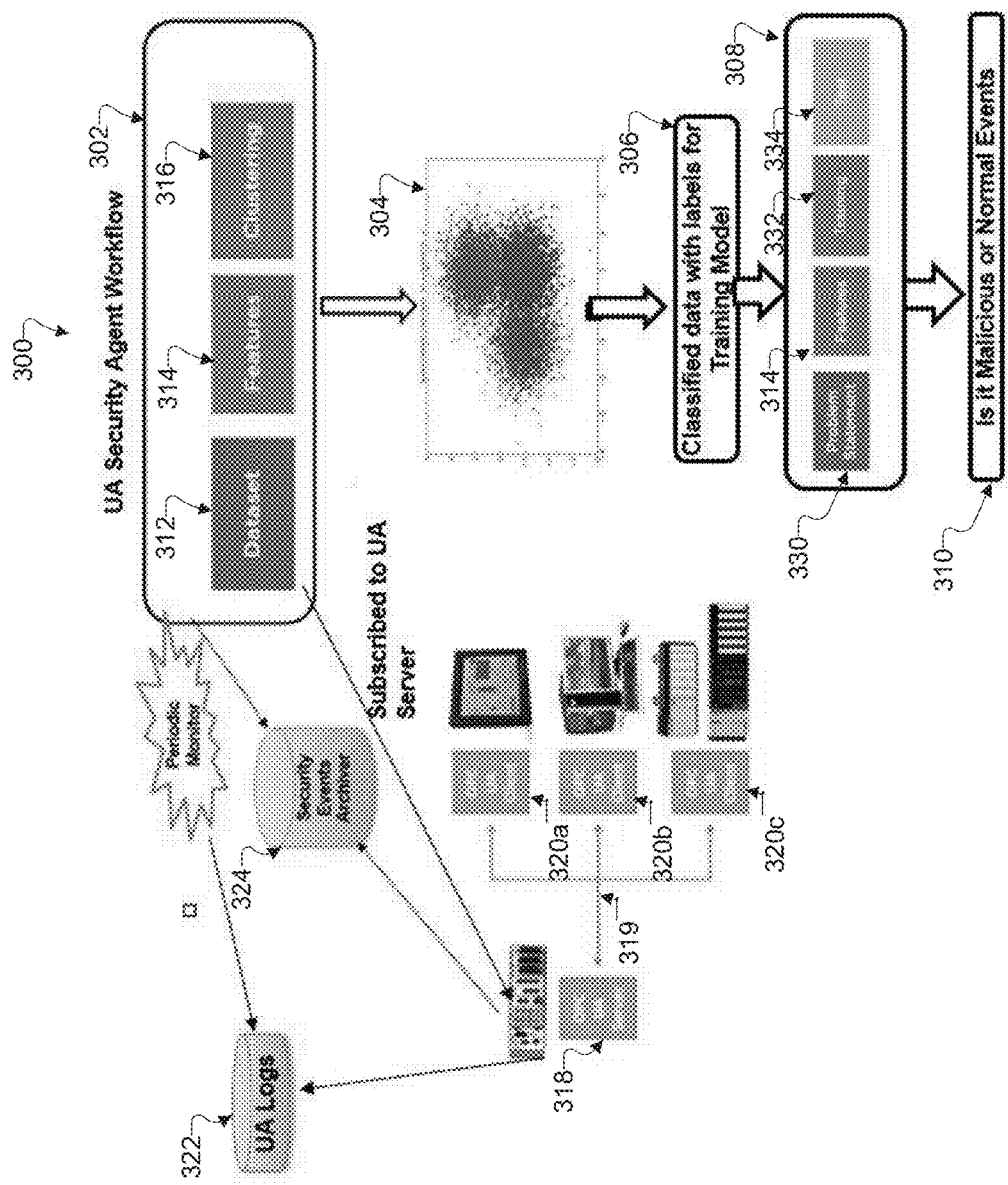
FIG. 3 illustrates an example UA security agent workflow according to this disclosure.

FIG. 3 illustrates an example a UA security agent workflow 300 according to this disclosure. The workflow 300 could, for example, be performed by any of the devices shown in FIG. 1 or device 200 shown in FIG. 2 described above. However, the workflow 300 could represent any other suitable workflow where an intelligent security agent in an IIoT ecosystem may be used.

As shown in FIG. 3, the workflow 300 includes a data collection stage 302, multiple clustering stages 304-306, a classification stage 308, and a detection stage 310. While these stages are shown in series, the stages could occur in a different order or in parallel.

The data collection stage 302 includes a dataset 312, features 314, and clustering functions 316. The dataset 312, features 314, and clustering functions 316 are obtained or retrieved at the data collection stage 302 for use in a clustering function to provide a grouping of communications at the clustering stage 304.

The dataset 312 can include data or communication information retrieved from a server 318 or historian of an OPC UA system, such as the system 100 as shown in FIG. 1. The server 318 or historian can include a database of UA log files 322 or a security events archiver 324. The UA log files include the log files and the security events archiver can include access requests and other events. Specifically, the dataset 312 can include log files, events, and alarms related to communications 319 between the server 318 and clients 320a-320c. The log files, events, and alarms can include, for example, "Hello" UA messages, Open Secure Channel Events and Requests, Session or Host IDSs, etc. The dataset 312 could include historical communication information collected over a period of time. The dataset 312 may also include current, real-time, or periodic information. The dataset 312 can also be periodically monitored for updated information.

The features 314 can include parameters, criteria, patterns, or rules set by a user or set dynamically by the workflow 300. The features 314 are extracted from the server 318 in a distributed environment from an event archiver 324 or a log file 322. The following features 314 are based on the various IIoT cyber threats or attack vectors that can be conducted on a UA node. Input features to be fed into the workflow 300 can include: SessionID/HostID; number of OpenSecureChannelEvents/Request; number of BadTcpMessageTooLarge; number of BadTooManyPublishRequests; number of BadUserAccessDenied; number of BadIdentityTokenRejected; number of BadSecureChannelIdInvalid; number of BadCertificateRevoked; No of Hello UA Messages; number of SecurityRejectedSessionCountEvent; number of SecurityRejectedRequestsCount; number of BadSecurityChecksFailed; number of BadCertificateHostNameInvalid; number of BadCertificateUriInvalid; number of BadCertificateUntrusted; and number of BadCertificateUseNotAllowed.

The clustering functions 316 can also be selected by a user, preset, or dynamically set by the workflow 300. The clustering function can include, for example, an unsupervised machine-learning algorithm. One example can include k-means clustering. At the clustering stage 304, the clustering function 316 groups the data together in such a way that objects in the same group are more similar to each other than to objects in other groups. In one example, the clustering functions 316 are used in conjunction with the dataset 312 and features 314 to provide a training model 332 where the communication information in the dataset 312 is grouped based on the features 314. In another embodiment, the data is grouped without reference to the features 314.

At the labeling stage 306, the workflow 300 labels the grouped data from the clustering stage 304. The labeling can be identifying which groups of data are malicious or not to create the training model 332. The training model 332 can include or be referred to as a plurality of patterns. These patterns can be used to help identify new malicious activity.

At the problem statement stage 308, a problem statement 330 is provided and compared to the training model 332. The problem statement 330 can include current or new data from server 318 or clients 320. The training model 332 can be based on the features 314. In one embodiment, a test 334 can be run to test the accuracy of the classified data. The training model 332 can be used by a probabilistic classifier, such as a naive Bayes classifier, to classify the problem statement 332 as malicious or not At the detection stage 310, the workflow 300 can identify whether the problem statement 330 is considered malicious based on the classified data. The problem statement 330 can include real-time or recent communication information, an access request from a client 320a-320c, etc.

Although FIG. 3 illustrates one example of a workflow 300 where an intelligent security agent in an IIoT ecosystem may be used, various changes may be made to FIG. 3. For example, various components in FIG. 3 could be combined, further subdivided, or omitted and additional components could be added according to particular needs. As a particular example, the server 318 could be divided into multiple servers.

Figure 4:
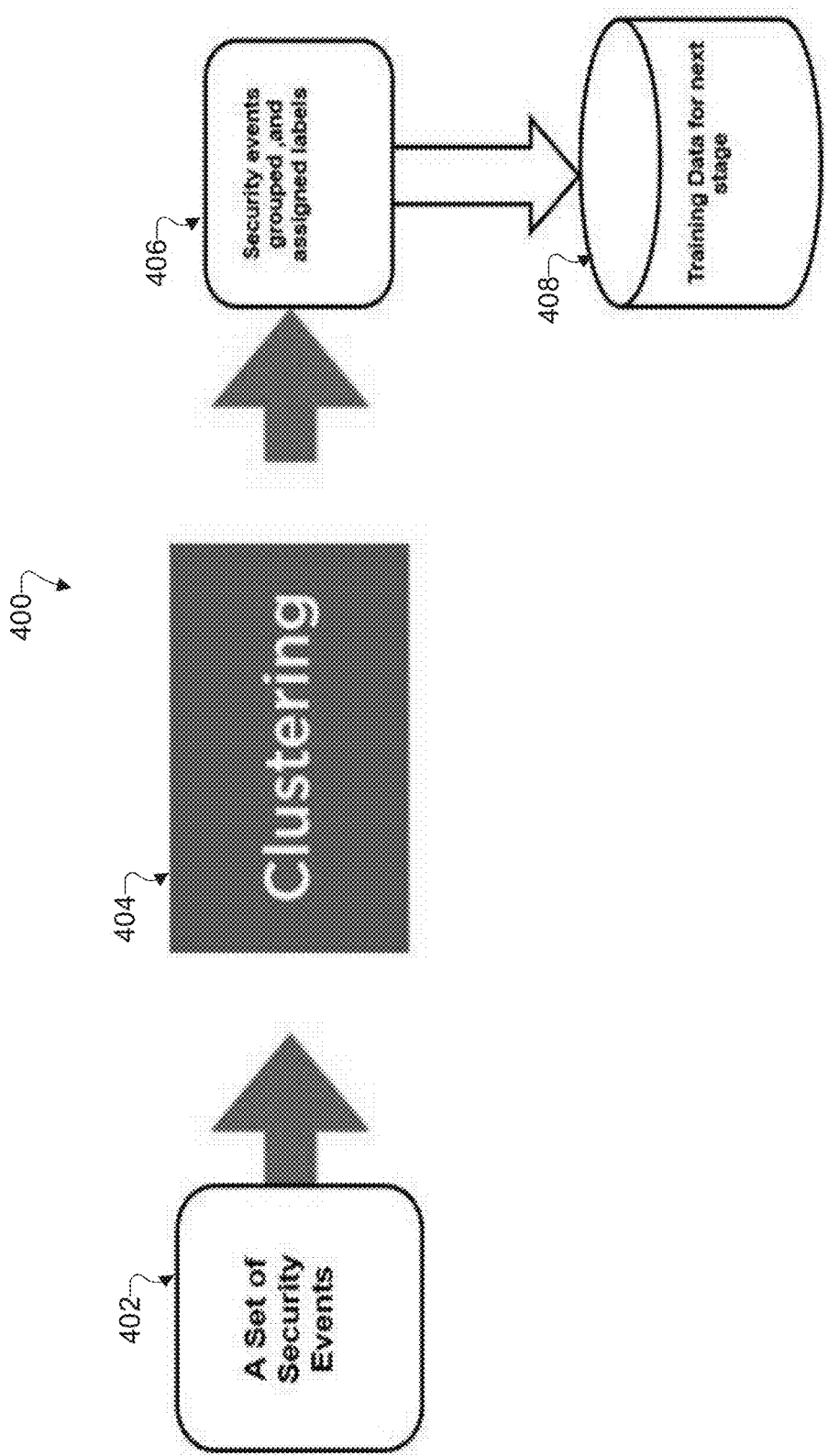
FIG. 4 illustrates an example clustering stage according to this disclosure.

FIG. 4 illustrates an example clustering stage 400 according to this disclosure. The stage 400 shown in FIG. 4 is for illustration only. The techniques and devices described in this disclosure could find use in a wide variety of situations and are not limited to the specific uses shown in FIG. 4. In one embodiment, the operations of the stage 400 can be performed using the device 200 as shown in FIG. 2.

In one embodiment, at operation 402, a set of security events can be retrieved by a device. The set of security events can be communication information between a server and a plurality of clients or a single client device. The set of security events can be obtained from the server itself, or a log file or archiver in a historian.

At operation 404, the device applies a clustering function to the set of security events. The clustering function provides a grouping of elements or security events to illustrate any patterns that may exist.

At operation 406, the device can provide the grouped security events and assigned labels. The assigned labels may indicate whether the grouped security events belong to a malicious category or not. The grouped data may be labeled based on the features set by a user or the system as shown in FIG. 3. As the data is grouped, the device can compare the groups to the features and identify any patterns that may be malicious. Based on the outcome of the clustering process, output labels are associated with the raw data to create a training model.

At operation 408, the device provides the training model or training data for the classifying stage. The training model include the patterns that exist regarding the communications between the clients and server.

Although FIG. 4 illustrates one example of a stage 400 for supporting automation of personalized maintenance tasks, various changes may be made to FIG. 4. For example, while FIG. 4 shows a series of steps, various steps could overlap, occur in parallel, occur in a different order, or occur any number of times.

Figure 5:
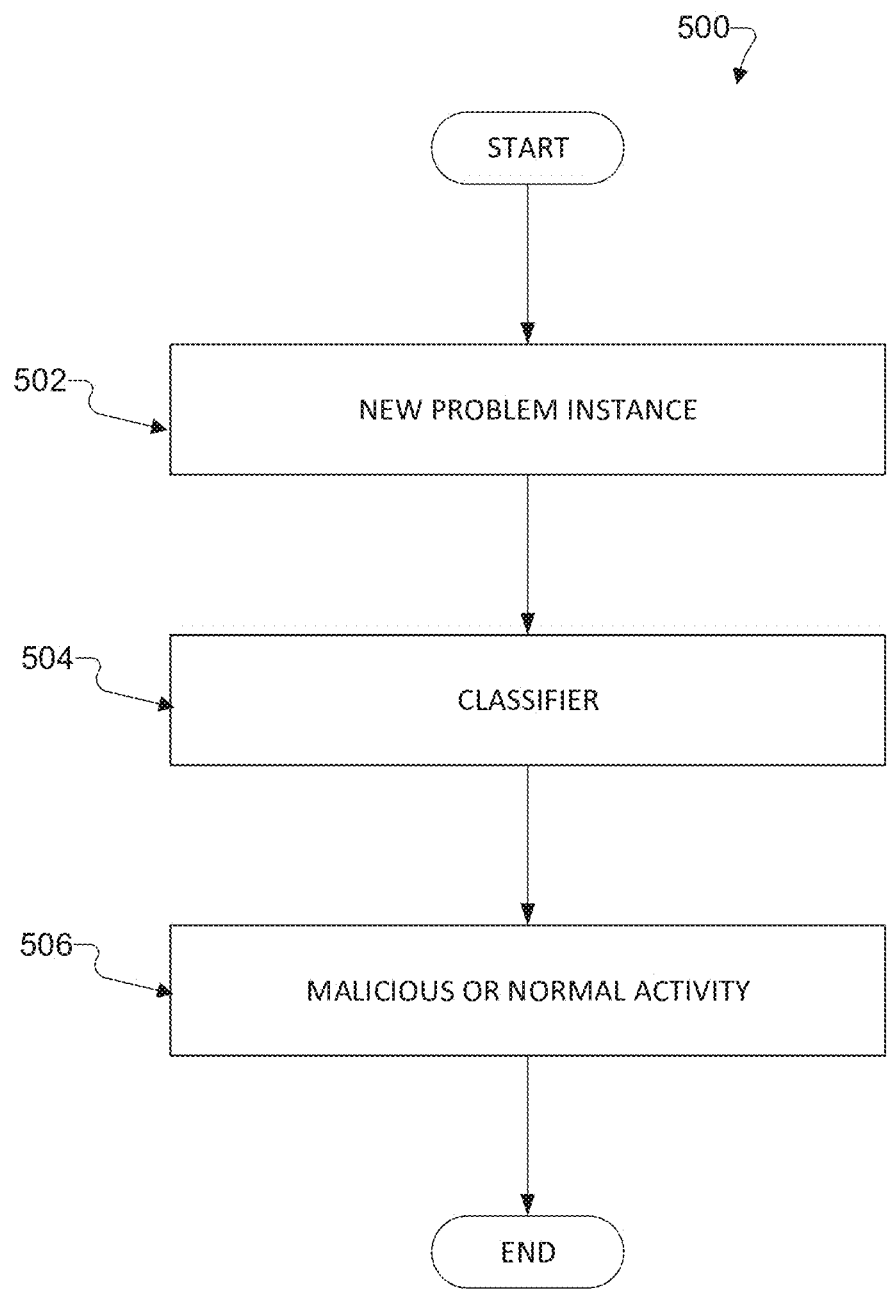
FIG. 5 illustrates an example classification and detection stage according to this disclosure.

FIG. 5 illustrates an example classification and detection stage 500 according to this disclosure. The stage 500 shown in FIG. 5 is for illustration only. The techniques and devices described in this disclosure could find use in a wide variety of situations and are not limited to the specific uses shown in FIG. 5. In one embodiment, the operations of the stage 500 can be performed using the device 200 as shown in FIG. 2. The device 200 could implement a security agent to perform the operations of method 500.

In one embodiment, at operation 502, a device provides a new problem instance. The new problem instance can be new or current data from the system devices, such as the servers or clients.

At operation 504, the device applies a classifier to the new problem instance using the training model obtained from the clustering stage. That is, the classifier is able to identify activity of the communication information based on a pattern learned, and now part of the training model, during the clustering stage.

At operation 506, the device classifies a communication or request, or set of communications or requests, as malicious or normal activity. In stage 500, a classifier such as a naïve Bayes can be used for malicious activity detection by providing an input problem instance. The result can pass from the security agent to the plant network administrator for further action.

Although FIG. 5 illustrates one example of a stage 500 for supporting classification and detection, various changes may be made to FIG. 5. For example, while FIG. 5 shows a series of steps, various steps could overlap, occur in parallel, occur in a different order, or occur any number of times.

Figure 6:
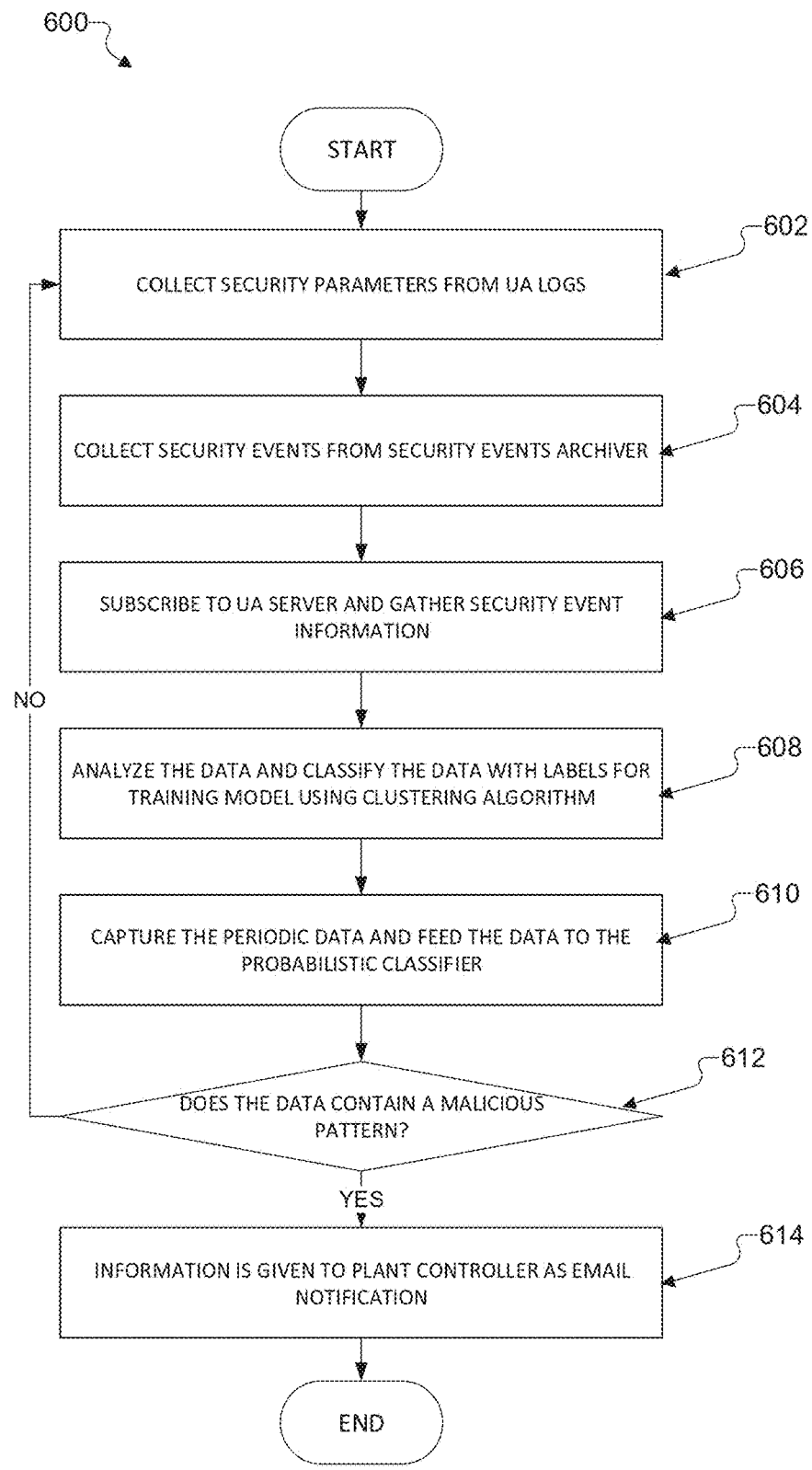
FIG. 6 illustrates an example method for identifying malicious activity according to this disclosure.

FIG. 6 illustrates an example method 600 for identifying malicious activity according to this disclosure. The method 600 shown in FIG. 6 is for illustration only. The techniques and devices described in this disclosure could find use in a wide variety of situations and are not limited to the specific uses shown in FIG. 6. In one embodiment, the operations of the method 600 can be performed using the device 200 as shown in FIG. 2. The device 200 could implement a security agent to perform the operations of method 600.

In one embodiment, at operation 602, parameters from UA log files can be retrieved by a device. The log files can be communication information between a server and a plurality of clients or a single client device. The log files can be obtained from the server itself or in a historian.

At operation 604, a set of security events can be retrieved by a device. The set of security events can be communication information between a server and a plurality of clients or a single client device. The set of security events can be obtained from the server itself or in a historian.

At operation 606, the device can subscribe to the server to gather security event information. The security event information can be communication information between a server and a plurality of clients or a single client device.

At operation 608, the device applies a clustering function to the communication information collected in operations 602-606. The clustering function provides a grouping of elements or communication information to illustrate any patterns that may exist. An example pattern may be, for example, a number of failed login attempts by a specific client over a period of time. The failed attempts may be shown to occur at a specific time of day, for example. The device can provide grouped communication information and assigned labels. The assigned labels may indicate for example, a number of "Hello" messages, etc. The labels provide the type of communication or access request. These labels may be based on the features 314 or other parameters.

At operation 610, the device can capture periodic data and feed the data to a probabilistic classifier. The periodic data can be new data from the server since the data collected in operations 602-606. The data collected in operations 602-606 can be historical communication information.

At operation 612, the device determines whether the periodic data includes a malicious pattern. A probabilistic classifier can be used to compare the new data to the parameters based on the training model. If no malicious pattern is found, the device can begin the method at operation 602. If a malicious pattern is found, then, at operation 614, the device can notify the plant controller using an email notification. In different embodiments, other types of notifications may be used, such as a notification sent to another operator, or a technician. The notification may be in the form of an alarm or other device notification.

Although FIG. 6 illustrates one example of a method 600 for identifying malicious activity, various changes may be made to FIG. 6. For example, while FIG. 6 shows a series of steps, various steps could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for identifying malicious activity in an IIoT ecosystem utilizing a unified architecture (UA) transport protocol comprising:
   retrieving, by an intelligent security agent, historical communication data from a UA log related to communications between a UA server and a plurality of UA clients in the IIoT ecosystem;
   clustering, by the intelligent security agent, the historical communication data to group communications of the historical communication data based on a combination of an unsupervised clustering algorithm and a supervised classifier algorithm;
   identifying a plurality of patterns that indicate the malicious activity based on the grouped communications;
   receiving current communication data;
   determining whether the current communication data matches the one of the plurality of patterns; and
   responsive to a grouped element of the grouped communications matching the pattern, identifying a group of communications between the UA server and the plurality of UA clients as the malicious activity.

2. The method of claim 1, further comprising:
   responsive to identifying the group of communications as the malicious activity, notifying a user of the system of the malicious activity.

3. The method of claim 1, wherein the historical communication data is retrieved from a historian and includes log files associated with connection data and one or more UA server or plurality of UA clients.

4. The method of claim 1, wherein the historical communication data is retrieved from a historian and includes alarm and security event data associated with the UA server.

5. The method of claim 1, wherein the historical communication data is retrieved from one or more of the UA server or plurality of UA clients.

6. The method of claim 1, wherein identifying the plurality of patterns for indicating the malicious activity based on the grouped communications comprises determining whether the grouped communication match any of a plurality of features.

7. The method of claim 1, wherein the historical communication data is grouped according to a type of communication.

8. A system for identifying malicious activity in an IIoT ecosystem utilizing a unified architecture (UA) transport protocol comprising:
   at least one memory configured to store historical communication data; and
   at least one processor configured to:
      retrieve, by an intelligent security agent, the historical communication data from a UA log related to communications between a UA server and a plurality of UA clients in the IIoT ecosystem;
      cluster, by an intelligent security agent, the historical communication data to group communications of the historical communication data based on a combination of an unsupervised clustering algorithm and a supervised classifier algorithm;
      identify a plurality of patterns that indicate malicious activity based on the grouped communications;
      receive current communication data;
      determine whether the current communication data matches the one of the plurality of patterns; and
      responsive to a grouped element of the grouped communications matching the pattern, identifying a group of communications between the UA server and the plurality of UA clients as the malicious activity.

9. The system of claim 8, responsive to identifying the group of communications as the malicious activity, notify a user of the system of the malicious activity.

10. The system of claim 8, wherein the historical communication data is retrieved from a historian and includes log files associated with connection data and one or more UA server or plurality of UA clients.

11. The system of claim 8, wherein the historical communication data is retrieved from a historian and includes alarm and security event data associated with the UA server.

12. The system of claim 8, wherein the historical communication data is retrieved from one or more UA server or plurality of UA clients.

13. The system of claim 8, wherein identifying the plurality of patterns for indicating the malicious activity based on the grouped communications comprises determining whether the grouped communication match any of a plurality of features.

14. The system of claim 8, wherein the historical communication data is grouped according to a type of communication.

15. A non-transitory computer readable medium containing instructions that when executed cause at least one processor to identify malicious activity in an IIoT ecosystem utilizing a unified architecture (UA) transport protocol:
   retrieve, by an intelligent security agent, historical communication data from a UA logs related to communications between a UA server and a plurality of UA clients in the IIoT ecosystem;
   cluster, by an intelligent security agent, the historical communication data to group communications of the historical communication data based on a combination of an unsupervised clustering algorithm and a supervised classifier algorithm;
   identify a plurality of patterns that indicate the malicious activity based on the grouped communications;
   receive current communication data;
   determine whether the current communication data matches the one of the plurality of patterns; and
   responsive to a grouped element of the grouped communications matching the pattern, identifying a group of communications between the UA server and the plurality of UA clients as the malicious activity.

16. The non-transitory computer readable medium of claim 15, responsive to identifying the group of communications as the malicious activity, notify a user of the system of the malicious activity.

17. The non-transitory computer readable medium of claim 15, wherein the historical communication data is retrieved from a historian and includes log files associated with connection data and one or more UA server or plurality of UA clients.

18. The non-transitory computer readable medium of claim 15, wherein the historical communication data is retrieved from a historian and includes alarm and security event data associated with the UA server.

19. The non-transitory computer readable medium of claim 15, wherein the historical communication data is retrieved from one or more UA server or plurality of UA clients.

20. The non-transitory computer readable medium of claim 15, wherein identifying the plurality of patterns for indicating the malicious activity based on the grouped communications comprises determining whether the grouped communication match any of a plurality of features.

* * * * *